Patented June 6, 1933

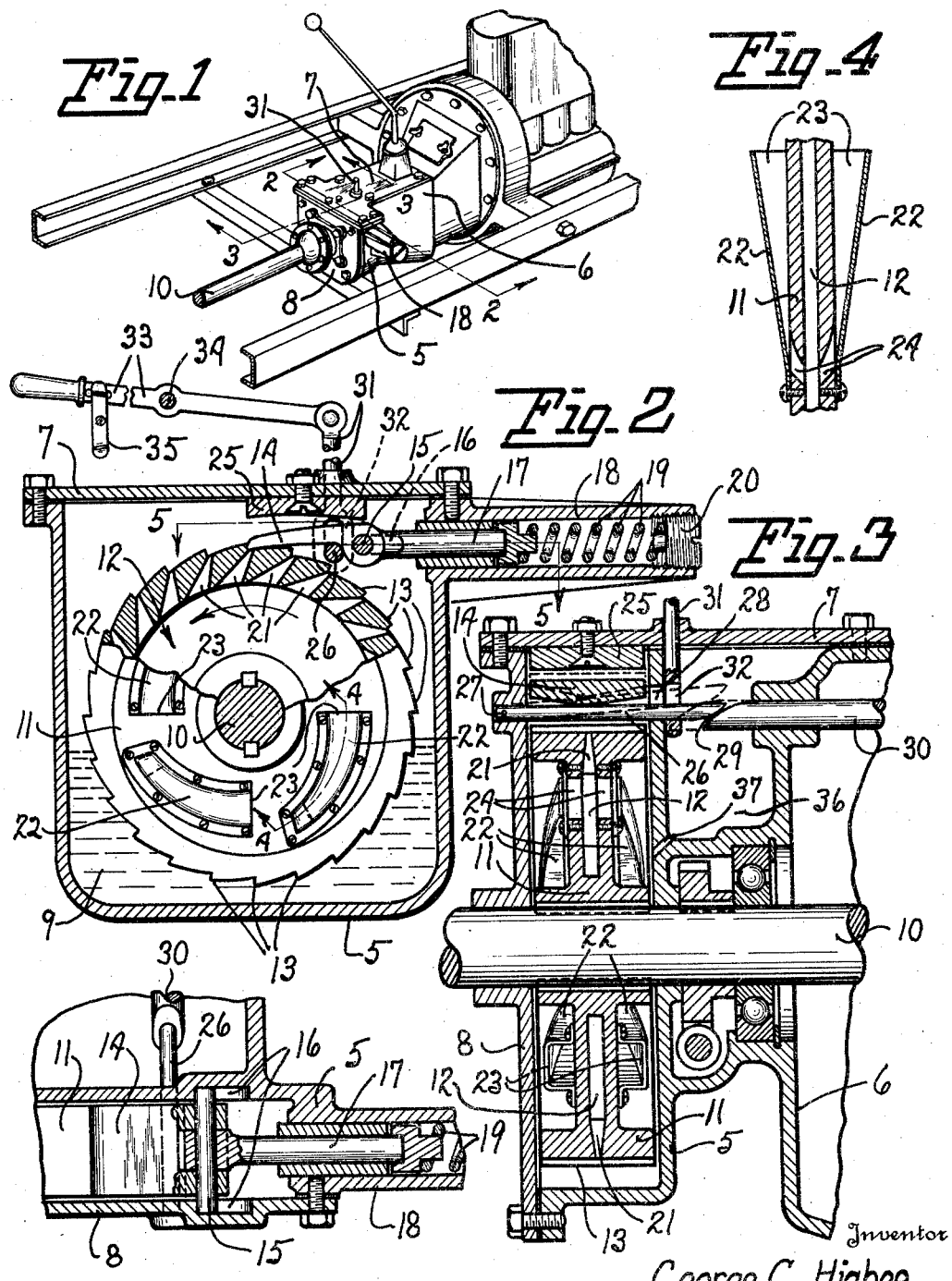

1,912,771

UNITED STATES PATENT OFFICE

GEORGE C. HIGBEE, OF TEKOA, WASHINGTON

MOTOR VEHICLE ANTIBACKWARD MOVEMENT DEVICE

Application filed November 30, 1931. Serial No. 578,055.

My invention relates to motor vehicle anti-backward movement devices and certain objects of the invention are to provide safety means whereby a motor vehicle is automatically prevented from coasting backward down hills and the like. Further objects are to provide shock and noise absorbing means for the device. Still further objects are to provide means whereby the function of the device may be manually and temporarily rendered non-effective whenever desired.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a general view in perspective showing the device installed on a motor vehicle chassis immediately back of the transmission; Fig. 2 is a view in transverse vertical section taken substantially on a broken line 2—2 of Fig. 1; Fig. 3 is a view in longitudinal vertical section taken on a broken line 3—3 of Fig. 1; Fig. 4 is a fragmentary view in section taken on a broken line 4—4 of Fig. 2 and showing the scoop pockets which convey the oil to the interior of the ratchet wheel; and Fig. 5 is a view in horizontal section taken on a broken line 5—5 of Fig. 2 and showing the guide means for the pawl and its associated elements.

Referring to the drawing throughout which like reference numerals indicate like parts, the numeral 5 designates a casing which may be secured to the rear end of a transmission housing 6 and is preferably an integral part thereof as shown in Fig. 3 of the drawing. Said casing is closed by a detachable top 7 and a rear detachable plate 8. As shown in Fig. 2, a pool of oil 9 is carried in the lower portion of said casing for reasons hereinafter set forth.

The drive shaft 10 of the motor vehicle is journaled through the casing 5 and its rear end plate 8 and a large ratchet wheel 11 is keyed to said shaft within the casing. Said ratchet wheel is made in two concave parts that are bolted together to provide a central chamber 12 as shown in Fig. 4. Teeth 13 are provided around the periphery of the ratchet wheel and are engaged by a pawl 14 that is pivotally mounted on a pin 15 whose ends are slidably mounted in slots in the forward end of the casing and in its rear end plate, as at 16. A short rod 17 is also pivoted to said pin and extends in a horizontal direction therefrom into a small cylindrical chamber 18 that is formed on or secured to a side of the main casing. A coiled spring 19 is mounted within said chamber in engagement with the end of the rod disposed therein and a screw 20 closes the outer end of said chamber and engages the spring whereby its tension may be regulated.

The foregoing arrangement provides means whereby the ratchet wheel 11 can only turn in one direction as indicated by the direction arrow in Fig. 2 which is the direction of rotation of the drive shaft 10 when the motor vehicle is moving forward. Should the vehicle start to move backward the teeth 13 of the ratchet wheel will be forced against the end of the pawl 14 thus pushing the rod 17 outwardly against the spring 19 and thereby absorbing the shock.

Small outlet ducts 21 are provided between the ratchet teeth 13 communicating with the central chamber 12 of the ratchet wheel 11. Scoop pockets 22 are secured to the outsides of the ratchet wheel and their larger or intake ends 23 are open to the outside while their smaller or discharge ends are provided with small conduits 24 communicating with the central chamber of the ratchet wheel. Thus, when said ratchet wheel is rotating as indicated in Fig. 2 the scoop pockets will pick up the oil 9 and deliver same into the central chamber 12. Centrifugal force of the ratchet wheel will throw the oil outwardly from said chamber through the small ducts 21. Besides lubricating the device, the oil thrown out through said ducts strikes against the pawl 14 and lifts it clear of the ratchet teeth 13. This prevents frictional wearing and clicking noise of the pawl, and a cushion 25 of suitable material is secured to the top 7 of the casing to prevent striking engagement of said pawl therewith.

Provision is made whereby the vehicle, or the direction of rotary movement of the drive shaft 10, may be reversed by providing a small lift rod 26 in engagement with the underside of the pawl 14. Said lift rod has one of its ends pivoted, as at 27, to the rear end plate 8 and its other end portion projects through a slot 28 in the forward end of the casing 5. Said projecting end is beveled, as at 29, and is arranged to be engaged by the correspondingly beveled end of the shifter rod 30 which slidably projects through the rear end of the transmission housing 6 as most clearly shown in Fig. 3 of the drawing. Therefore when the vehicle is placed in reverse said shifter rod will be moved rearwardly to the dotted position and the lift rod will be lifted to the dotted position shown in Fig. 3 thus raising the pawl 14 free of the ratchet wheel teeth 13.

For the purpose of temporarily eliminating the function of the device so that the vehicle may be pushed backwards, I have provided an upstanding rod 31 extending slidably through the top 7 of the casing 5. Said rod has a lower slotted end portion 32 through which the lift rod 26 extends and its upper end is pivoted to a hand lever 33. Said lever is pivotally supported at 34 by any suitable means and a guide and stop member 35 is provided for the handle end portion of said lever. When said handle end is pushed downwardly the lift rod 26 raises the pawl 14 out of engagement with the teeth of the ratchet wheel 11 so that said wheel may revolve in a direction counter to its normal direction of rotation. The vehicle may then be pushed backwards as will be understood.

In case any oil should leak out through the slot 28 provided in the casing 5 for the lift rod 26, said oil will accumulate in the pocket 36 between said casing and the transmission housing 6. I have therefore provided an aperture 37 at the bottom of said pocket and through the forward wall of said casing whereby this oil may drain back into the casing 5.

Having thus described my invention, it being understood that minor changes may be resorted to in its construction and arrangement without departing from the scope and spirit of the invention, what I claim and desire to secure by Letters Patent of the United States is:—

1. The combination with a motor vehicle transmission and its drive shaft, of an anti-backward movement device comprising a casing adjoining the rear end of the transmission and enclosing a portion of its drive shaft, a ratchet wheel fixed to the drive shaft within the casing, a pawl in engagement with the ratchet wheel, a lift rod pivotally mounted in engagement with the underside of the pawl and having a beveled end, and a slidably disposed shifter rod having a beveled end in engagement with the beveled end of the lift rod whereby said lift rod raises the pawl out of engagement with the ratchet wheel when the shifter rod is moved rearwardly against the lift rod.

2. The combination with a motor vehicle transmission and its drive shaft, of an anti-backward movement device comprising a casing adjoining the rear end of the transmission housing and enclosing a portion of the drive shaft, a ratchet wheel fixed to the drive shaft within the casing and having a central chamber therein, a pawl in engagement with the ratchet wheel, said ratchet wheel having a plurality of outlet ducts between its teeth in communication with its central chamber and directed toward the pawl, a pool of oil within the casting partly submerging the ratchet wheel, a plurality of scoop pockets fixed to the outsides of the ratchet wheel, and said scoop pockets having open scoop ends on the outside of the wheel and conduits leading into the central chamber of the wheel whereby the oil is conveyed to said central chamber and projected therefrom by centrifugal force through the outlet ducts against the pawl upon rotary movement of the ratchet wheel.

3. In a motor vehicle anti-backward movement device comprising a hollow ratchet wheel mounted within a casing and fixed to the drive shaft of a vehicle and having peripheral outlet ducts, a pool of oil within the casing and partly submerging the ratchet wheel, a pawl in engagement with the ratchet wheel and the outlet ducts, means for slidable movement of the pawl, and spring means to cushion the slidable movement of said pawl, the combination of a plurality of scoop pockets fixed to the ratchet wheel and communicating with its interior whereby oil is picked up from the pool, passed into the ratchet wheel and projected out through its peripheral ducts by centrifugal force upon rotary movement of the ratchet wheel, and whereby the pawl is lifted out of engagement with the ratchet wheel by the peripheral discharge of the oil.

4. In a motor vehicle anti-backward movement device comprising a hollow ratchet wheel mounted for rotary movement in a pool of oil and having scoop pockets and peripheral outlets whereby oil is taken into the ratchet wheel and projected outwardly through the peripheral outlets upon rotary movement of the wheel, the combination of a pivotally mounted pawl in engagement with the ratchet wheel and peripheral outlets whereby said pawl is lifted out of engagement with the ratchet wheel by the peripheral discharge of oil.

5. A motor vehicle anti-backward movement device comprising a hollow ratchet wheel mounted for rotary movement within a pool of oil and having peripheral outlets, a pawl in engagement with the ratchet wheel and peripheral outlets, and scoop pockets fixed to the ratchet wheel and communicating with its interior.

In testimony whereof I affix my signature.

GEORGE C. HIGBEE.